US011693251B2

(12) United States Patent
Uhlendorf (10) Patent No.: US 11,693,251 B2
(45) Date of Patent: *Jul. 4, 2023

(54) METHOD AND SYSTEM FOR RGB ILLUMINATOR

(71) Applicant: Magic Leap, Inc., Plantation, FL (US)

(72) Inventor: Kristina Uhlendorf, Jena (DE)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,879

(22) Filed: Sep. 7, 2022

(65) Prior Publication Data

US 2023/0004014 A1 Jan. 5, 2023

Related U.S. Application Data (63) Continuation of application No. 17/129,701, filed on Dec. 21, 2020, now Pat. No. 11,474,364, which is a
(Continued)

(51) Int. Cl.
*G02B 27/14* (2006.01)
*G02B 27/10* (2006.01)

(52) U.S. Cl.
CPC ....... *G02B 27/141* (2013.01); *G02B 27/1013* (2013.01)

(58) Field of Classification Search
CPC .................. G02B 27/141; G02B 27/1013
See application file for complete search history.

(56) References Cited

U.S. PATENT DOCUMENTS

| 4,186,899 A | 2/1980 | Stewart, Jr. |
| 4,283,116 A | 8/1981 | Weis |

(Continued)

FOREIGN PATENT DOCUMENTS

| CN | 102239437 A | 11/2011 |
| CN | 102804057 A | 11/2012 |

(Continued)

OTHER PUBLICATIONS

U.S. Appl. No. 17/129,701, "Non-Final Office Action", dated Mar. 7, 2022, 16 pages.
(Continued)

*Primary Examiner* — Anne M Hines
*Assistant Examiner* — Jose M Diaz
(74) *Attorney, Agent, or Firm* — Kilpatrick Townsend & Stockton LLP (57) ABSTRACT

An optical combiner includes a curved reflective element and a rotating mirror configured to rotate through a range of angular displacement. During a first time period, the curved reflective element is configured to reflect a first light beam emitted from a first light source to the rotating mirror when the rotating mirror is disposed at a first angular displacement, and the rotating mirror is configured to receive the first reflected light beam and provide a first output light beam along an output optical axis. During a second time period, the curved reflective element is configured to reflect a second light beam emitted from a second light source to the rotating mirror when the rotating mirror is disposed at a second angular displacement, and the rotating mirror is configured to receive the second reflected light beam and provide a second output light beam along the output optical axis.

16 Claims, 8 Drawing Sheets

Related U.S. Application Data continuation of application No. PCT/US2019/038608, filed on Jun. 21, 2019.

(60) Provisional application No. 62/689,001, filed on Jun. 22, 2018.

(56) References Cited

U.S. PATENT DOCUMENTS

| | | | |
|---|---|---|---|
| 7,769,255 | B2 | 8/2010 | Nagy et al. |
| 11,474,364 | B2 * | 10/2022 | Uhlendorf .......... G02B 27/0172 |
| 2005/0231808 | A1 | 10/2005 | Watson et al. |
| 2009/0161193 | A1 | 6/2009 | Maeda et al. |
| 2009/0232446 | A1 | 9/2009 | Nagy et al. |
| 2009/0251783 | A1 | 10/2009 | Huibers et al. |
| 2012/0154766 | A1 | 6/2012 | Choi et al. |
| 2014/0126235 | A1 | 5/2014 | Speier et al. |
| 2014/0333900 | A1 | 11/2014 | Aboshi et al. |
| 2017/0102538 | A1 | 4/2017 | Garnet et al. |
| 2021/0181519 | A1 | 6/2021 | Uhlendorf |

FOREIGN PATENT DOCUMENTS

| | | | |
|---|---|---|---|
| CN | 103858244 | A | 6/2014 |
| CN | 104730830 | A | 6/2015 |
| CN | 108025908 | A | 5/2018 |
| CN | 112513718 | A | 3/2021 |
| EP | 3811145 | A1 | 4/2021 |
| JP | 62127821 | A | 6/1987 |
| JP | 2003322812 | A | 11/2003 |
| JP | 2003344948 | A | 12/2003 |
| JP | 2004354493 | A | 12/2004 |
| JP | 2010040443 | A | 2/2010 |
| JP | 2013143329 | A | 7/2013 |
| JP | 2014060452 | A | 4/2014 |
| JP | 2017146602 | A | 8/2017 |
| WO | 2019246598 | A1 | 12/2019 |

OTHER PUBLICATIONS

U.S. Appl. No. 17/129,701, "Notice of Allowance", dated Jun. 8, 2022, 9 pages.

Application No. CN201980050339.3, "Office Action" and English translation, Oct. 9, 2022, 11 pages.

Application No. EP19823270.4, "Extended European Search Report", Mar. 14, 2022, 14 pages.

Application No. EP19823270.4, "Partial Supplementary European Search Report", Dec. 7, 2021, 16 pages.

Application No. PCT/US2019/038608, "International Preliminary Report on Patentability", Dec. 30, 2020, 12 pages.

Application No. PCT/US2019/038608, "International Search Report and Written Opinion", Sep. 10, 2019, 13 pages.

Application No. JP2020-571481, "Office Action" and English translation, dated Mar. 20, 2023, 8 pages.

* cited by examiner

METHOD AND SYSTEM FOR RGB ILLUMINATOR

CROSS-REFERENCES TO RELATED APPLICATIONS

This application is a continuation of U.S. patent application Ser. No. 17/129,701, filed Dec. 21, 2020, now U.S. Pat. No. 11,474,364, issued Oct. 18, 2022, entitled "METHOD AND SYSTEM FOR RGB ILLUMINATOR," which is a continuation of International Patent Application No. PCT/US2019/038608, filed Jun. 21, 2019, entitled "METHOD AND SYSTEM FOR RGB ILLUMINATOR," which claims the benefit of priority to U.S. Provisional Patent Application No. 62/689,001, filed Jun. 22, 2018, entitled "METHOD AND SYSTEM FOR RGB ILLUMINATOR," the entire disclosures of which are hereby incorporated by reference, for all purposes, as if fully set forth herein.

BACKGROUND OF THE INVENTION

Modern computing and display technologies have facilitated the development of systems for so-called "virtual reality" or "augmented reality" experiences, where digitally produced images are presented in a wearable device to a user in a manner where they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

The wearable device may include augmented and/or virtual reality glasses. The image can be displayed using image frames or raster scanned images. In these display devices, optical combiners are often used to combine light beams from different light sources. For example, red, green, and blue light beams can be combined to form a collimated combined colored light beam for displaying an image. Conventional optical combiners made with glass lenses, mirrors, and prisms can be bulky and heavy. They are undesirable for wearable device in VR or AR applications.

Therefore, improved structures and methods for optical combiners are highly desirable.

SUMMARY OF THE INVENTION

Embodiments of the present invention provide methods and systems for RGB (Red Green Blue) illuminators that are compact and light weight compared with conventional combiners. Some embodiments can also provide speckle reduction. In embodiments of the invention, the optical combiners can combine light beams from two or more light sources, such as laser diodes. In some embodiments, a mirror assembly reflects light beams from the light sources towards a combining element, which produces combined output beams along a common optical axis. The mirrors direct the beams to the combining element to achieve collinearity. The spatial arrangement of the mirror assembly and the combining element provides folded optical paths to reduce the dimension of the optical combiner. The mirror assembly can be a set of multiple mirrors or a single reflective element. Collimation and circularization can be achieved by a combination of refractive lens (for instance, toroidal) and mirrors (rotational symmetric/off-axis parabolic or freeform). These elements can be individual for each source or the same for each source. Therefore it can be a 'segmented/separated' solution or monolithic solution per element.

The combining element can be a stack of dichroic mirrors, prism configurations based on dichroic beam-combining, diffractive elements, or MEMS (Micro-electro-mechanical-system) mirrors. For example, the combining element can be a rotating MEMS mirror, which is tilted at a different angular displacement for each light source. For coherent sources, speckle reduction can be achieved in combination with an etendue generating element (for instance holographic diffusor) by wobbling the combining element to slightly shift the beam. Embodiments based on the rotating MEMS mirror can provide dithering of the light beams without requiring additional elements. In other embodiments, to provide beam dithering would need an additional actuator.

According to some embodiments of the invention, an optical combiner includes an input mirror assembly configured to receive multiple light beams and to provide a first reflected light beam, a second reflected light beam, and a third reflected light beam. The optical combiner also includes a rotating mirror configured to rotate through a range of angular displacement. During a first time period, the rotating mirror is disposed at a first angular displacement, and configured to receive the first reflected light beam from the input mirror assembly and provide a first output light beam along an output optical axis. During a second time period, the rotating mirror is disposed at a second angular displacement, and configured to receive the second reflected light beam from the input mirror assembly and provide a second output light beam along the output optical axis. During a third time period, the rotating mirror is disposed at a third angular displacement, and configured to receive the third reflected light beam from the input mirror assembly and provide a third output light beam along the output optical axis. The optical combiner is configured to provide a time-sequential collimated combined output light beam along the output optical axis, and is configured to dither the combined output light beam.

In some embodiments of the above optical combiner, the input mirror assembly includes a first input mirror disposed in a first light path between the rotating mirror and a first light source and configured to reflect a first input light beam emitted from the first light source and direct the first reflected light beam to the rotating mirror during the first time period when the rotating mirror is at the first angular displacement. The input mirror assembly also includes a second input mirror disposed in a second light path between the rotating mirror and a second light source and configured to reflect a second input light beam emitted from the second light source and direct the second reflected light beam to the rotating mirror during the second time period when the rotating mirror is at the second angular displacement. The input mirror assembly further includes a third input mirror disposed in a third light path between the rotating mirror and a third light source and configured to reflect a third input light beam emitted from the third light source and direct the third reflected light beam to the rotating mirror during the third time period when the rotating mirror is at the third angular displacement.

In some embodiments of the above optical combiner, the first light source is a red laser light source, the second light source is a green laser light source, and the third light source is a blue laser light source. Each of the first input mirror, the second input mirror, and the third input mirror is a collimating and circularizing mirror.

In some embodiments, the first light source, the second light source, the third light source, and the input mirror assembly are disposed in a two-dimensional planar configuration, and the rotating mirror is disposed offset in a third dimension to provide folded optical paths, thereby reducing a dimension of the optical combiner.

In alternative embodiments, the input mirror assembly can include a curved reflective element configured to reflect a first input light beam emitted from a first light source to the rotating mirror during the first time period when the rotating mirror is at the first angular displacement, reflect a second input light beam emitted from a second light source to the rotating mirror during the second time period when the rotating mirror is at the second angular displacement, and reflect a third input light beam emitted from a third light source to the rotating mirror during the third time period when the rotating mirror is at the second angular displacement.

In some embodiments, the curved reflective element can have discrete prescriptions for each individual incidence location on the curved reflective element. In some embodiments, the curved reflective element can have a parabolic surface contour. In some embodiments, the curved reflective element can have an elliptical surface contour. In some embodiments, the curved reflective element can have a hyperbolic surface contour.

Depending on the embodiments, the rotating mirror can be a one-axis MEMS mirror or a two-axis MEMS mirror.

In some embodiments, an RGB illuminator includes red, green, and blue laser light sources and an optical combiner as described above.

According to some embodiments, an optical combiner can include a rotating mirror configured to rotate through a range of angular displacement. During a first time period, the rotating mirror is disposed at a first angular displacement, and configured to receive a first incident light beam and provide a first output light beam along an output optical axis. During a second time period, the rotating mirror is disposed at a second angular displacement, and configured to receive a second incident light beam and provide a second output light beam along the output optical axis. The optical combiner is configured to provide a time sequential collimated combined light beam.

In some embodiments of the above optical combiner, the rotating mirror is configured to dither the first output light beam and the second output light beam.

In some embodiments, the optical combiner also includes an input mirror assembly configured to receive a first input light beam and a second input light beam from a first light source and a second light source, respectively, reflect the first input light beam to form a first reflected light beam to provide the first incident light beam to the rotating mirror, and reflect the second input light beam to form a second reflected light beam to provide the second incident light beam to the rotating mirror.

In some embodiments, the input mirror assembly includes a first input mirror disposed in a first light path between the rotating mirror and the first light source and configured to reflect the first input light beam emitted from the first light source and direct the first reflected light beam to the rotating mirror during the first time period when the rotating mirror is at the first angular displacement. The first reflected light beam forms the first incident light beam to the rotating mirror. The input mirror assembly also includes a second input mirror disposed in a second light path of the rotating mirror and the second light source and configured to reflect the second input light beam emitted from the second light source and direct the second reflected light beam to the rotating mirror during the second time period when the rotating mirror is at the second angular displacement. The second reflected light beam forms the second incident light beam to the rotating mirror.

In some embodiments, the first input mirror and the second input mirror are collimating and circularizing mirrors.

In some embodiments, the input mirror assembly can include a curved reflective element configured to reflect the first input light beam emitted from the first light source to the rotating mirror during the first time period when the rotating mirror is at the first angular displacement, and reflect the second input light beam emitted from the second light source to the rotating mirror during the second time period when the rotating mirror is at the second angular displacement.

According to some embodiments, a method for combining light beams from multiple light sources includes, during a first time period, disposing a rotating mirror at a first angular displacement, and receiving a first incident light beam to provide a first output light beam along an output optical axis. The method includes, during a second time period, disposing the rotating mirror at a second angular displacement, and receiving a second incident light beam to provide a second output light beam along the output optical axis. The method further includes repeating the above operation to provide a time-sequential collimated combined output light beam along the output optical axis.

In some embodiments, the above method can also include, during a third time period, disposing the rotating mirror at a third angular displacement, and receiving a third incident light beam to provide a third output light beam along the output optical axis.

In some embodiments, the method can also include dithering the combined output light beam using the rotating mirror.

In some embodiments, the method can also include receiving a first input light beam and a second input light beam from a first light source and a second light source, respectively, using an input mirror assembly. The method can further include reflecting the first input light beam to form a first reflected light beam to provide the first incident light beam to the rotating mirror, using the input mirror assembly, and reflecting the second input light beam to form a second reflected light beam to provide the first incident light beam to the rotating mirror, using the input mirror assembly.

In some embodiments, the method also includes collimating and circularizing the first output light beam and the second output light beam using the input mirror assembly.

In some embodiments, the curved reflective element comprises a parabolic surface contour.

In some embodiments, the curved reflective element comprises an elliptical surface contour.

In some embodiments, the curved reflective element comprises a hyperbolic surface contour.

In some embodiments, the method includes forming an RGB (Red Green Blue) illuminator with the optical combiner described above, a red laser light source, a green laser light source, and a blue laser light source.

According to some embodiments, an optical combiner has a dichroic mirror assembly including a first dichroic mirror, a second dichroic mirror, and a third dichroic mirror arranged in a stack along an output optical axis. The first dichroic mirror is configured to reflect light beams of a first color. The second dichroic mirror is configured to reflect light beams of a second color and to transmit light beams of the first color. The third dichroic mirror is configured to reflect light beams of a third color and to transmit light beams of the first color and light beams of the second color. The first dichroic mirror is disposed at a first angular displacement and configured to receive a first incident light beam of a first color and provide a first output light beam along an output optical axis. The second dichroic mirror is disposed at a second angular displacement and configured to receive a second incident light beam of a second color and provide a second output light beam along the output optical axis. The third dichroic mirror is disposed at a third angular displacement and configured to receive a third incident light beam of a third color and provide a third output light beam along the output optical axis. The optical combiner is configured to provide a collimated combined output light beam along the output optical axis. In an alternative embodiment, the first dichroic mirror can be replaced with a reflective mirror.

In some embodiments, a portion of the first incident light beam passes through the third dichroic mirror and the second dichroic mirror before reaching the first dichroic mirror, and a portion of the second incident light beam passes through the third dichroic mirror before reaching the second dichroic mirror.

In some embodiments, a portion of the first output light beam passes through the second dichroic mirror and the third dichroic mirror before reaching the first dichroic mirror; and a portion of the second output light beam passes through the third dichroic mirror before reaching the second dichroic mirror.

In some embodiments, the optical combiner also includes an input mirror assembly configured to receive a first input light beam, a second input light beam, and a third input light beam from a first light source, a second light source, and a third light source, respectively. The input mirror assembly is also configured to reflect the first input light beam to form a first reflected light beam to provide the first incident light beam to the dichroic mirror assembly, reflect the second input light beam to form a second reflected light beam to provide the second incident light beam to the dichroic mirror assembly, and reflect the third input light beam to form a third reflected light beam to provide the third incident light beam to the dichroic mirror assembly.

In some embodiments, the input mirror assembly includes a first input mirror, a second input mirror, and a third input mirror. The first input mirror is disposed in a first light path between the dichroic mirror assembly and the first light source and configured to reflect the first input light beam emitted from the first light source and direct the first reflected light beam to the dichroic mirror assembly, wherein the first reflected light beam forms the first incident light beam to the dichroic mirror assembly. The second input mirror is disposed in a second light path between the dichroic mirror assembly and the second light source and configured to reflect the second input light beam emitted from the second light source and direct the second reflected light beam to the dichroic mirror assembly, wherein the second reflected light beam forms the second incident light beam to the dichroic mirror assembly. The third input mirror disposed in a third light path between the dichroic mirror assembly and the third light source and configured to reflect the second input light beam emitted from the third light source and direct the third reflected light beam to the dichroic mirror assembly, wherein the second reflected light beam forms the second incident light beam to the dichroic mirror assembly.

In some embodiments, the first input mirror, the second input mirror, and the third input mirror in the input mirror assembly are collimating and circularizing mirrors.

In some embodiments, the input mirror assembly includes a curved reflective element configured to reflect the first input light beam emitted from the first light source to the dichroic mirror assembly, reflect the second input light beam emitted from the second light source to the dichroic mirror assembly, and reflect the third input light beam emitted from the third light source to the dichroic mirror assembly.

In some embodiments, the curved reflective element comprises discrete prescriptions for each individual incidence location on the curved reflective element.

In some embodiments, the curved reflective element comprises a parabolic surface contour.

In some embodiments, the curved reflective element comprises an elliptical surface contour.

In some embodiments, the curved reflective element comprises a hyperbolic surface contour.

In some embodiments, an RGB (Red Green Blue) illuminator includes the optical combiner having the dichroic mirror assembly described above, a red laser light source, a green laser light source, and a blue laser light source.

According to some embodiments, a method for combining light beams from multiple light sources includes providing a dichroic mirror assembly including a first dichroic mirror, a second dichroic mirror, and a third dichroic mirror arranged in a stack along an output optical axis. The first dichroic mirror is configured to reflect light beams of a first color. The second dichroic mirror is configured to reflect light beams of a second color and to transmit light beams of the first color. The third dichroic mirror is configured to reflect light beams of a third color and to transmit light beams of the first color and light beams of the second color. The method includes disposing the first dichroic mirror at a first angular displacement to receive a first incident light beam of a first color and provide a first output light beam along an output optical axis. The method also includes disposing the second dichroic mirror at a second angular displacement to receive a second incident light beam of a second color and provide a second output light beam along the output optical axis. The method further includes disposing the third dichroic mirror at a third angular displacement to receive a third incident light beam of a third color and provide a third output light beam along the output optical axis. The method configures the optical combiner to provide a collimated combined output light beam along the output optical axis. In an alternative embodiment, the first dichroic mirror can be replaced with a reflective mirror.

In some embodiments, the method can also include dithering the combined output light beam using the rotating mirror.

Additional features, benefits, and embodiments are described below in the detailed description, figures, and claims.

DETAILED DESCRIPTION OF THE INVENTION

Embodiments of the present invention are directed to optical combiner systems and methods to provide an optical illuminator for projecting light beams from multiple light sources for a wearable device.

Figure 1:
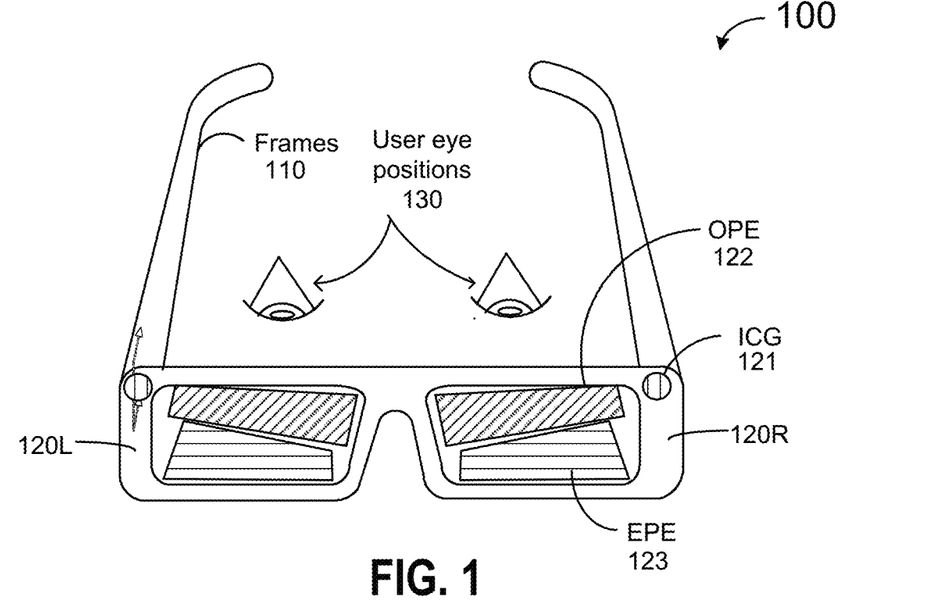
FIG. 1 is a perspective view of an exemplary augmented reality glasses according to some embodiments.

FIG. 1 is a perspective view of an exemplary augmented reality glasses 100 according to some embodiments. The augmented reality glasses 100 is an example of a wearable device for virtual reality or augmented reality applications. As shown in FIG. 1, wearable display device 100 can include frames 110 supporting a left waveguide eyepiece 120L and a right waveguide eyepiece 120R. Each waveguide eyepiece 120L and 120R can include an input coupling grating (ICG) 121, an orthogonal pupil expander (OPE) 122, and an exit pupil expander (EPE) 123. The input coupling grating is also referred to as the input coupling port. The input coupling grating (ICG) 121, orthogonal pupil expander (OPE) 122, and exit pupil expander (EPE) 123 can be suitable diffractive optical elements (DOEs). For example, they can take the form of gratings formed on an optical waveguide. According to certain embodiments, rather than providing a single waveguide for each eyepiece, each eyepiece can have a stack of multiple optical waveguides, for different colors and with different optical power EPEs. The EPEs are configured to project images that can be viewed from the user eye positions 130.

In FIG. 1, incoming light, which can be image light or a scanning light beam, can be incident upon the ICG (121) of each eyepiece 120L, 120R. Each ICG 121 couples the incoming light into guided mode propagating in a direction toward the OPE region 122. The eyepiece propagates the image light by total internal reflection (TIR). The OPE region 122 of each eyepiece 120L, 120R can also include a diffractive element that couples and redirects a portion of the image light propagating in the eyepiece 120L, 120R toward the EPE region 123. The EPE region 123 includes a diffractive element that couples and directs a portion of the light propagating in each eyepiece 120L, 120R in a direction outward from the plane of the eyepiece layer 120 toward the viewer's eye positions 130. In this fashion, an image may be viewed by the viewer.

The incoming light may include light in the three primary colors, namely blue (B), green (G), and red (R).

In some applications, the eyepiece can accept collimated light which is scanned in two degrees of freedom. Each instantaneous angle of incidence (or small range of angle of incidence) corresponds to an angularly defined pixel. In some embodiments, the light can be configured to simulate a virtual object, which can appear to be some distance, e.g., half a meter to a meter, away from the viewer.

Figure 2:
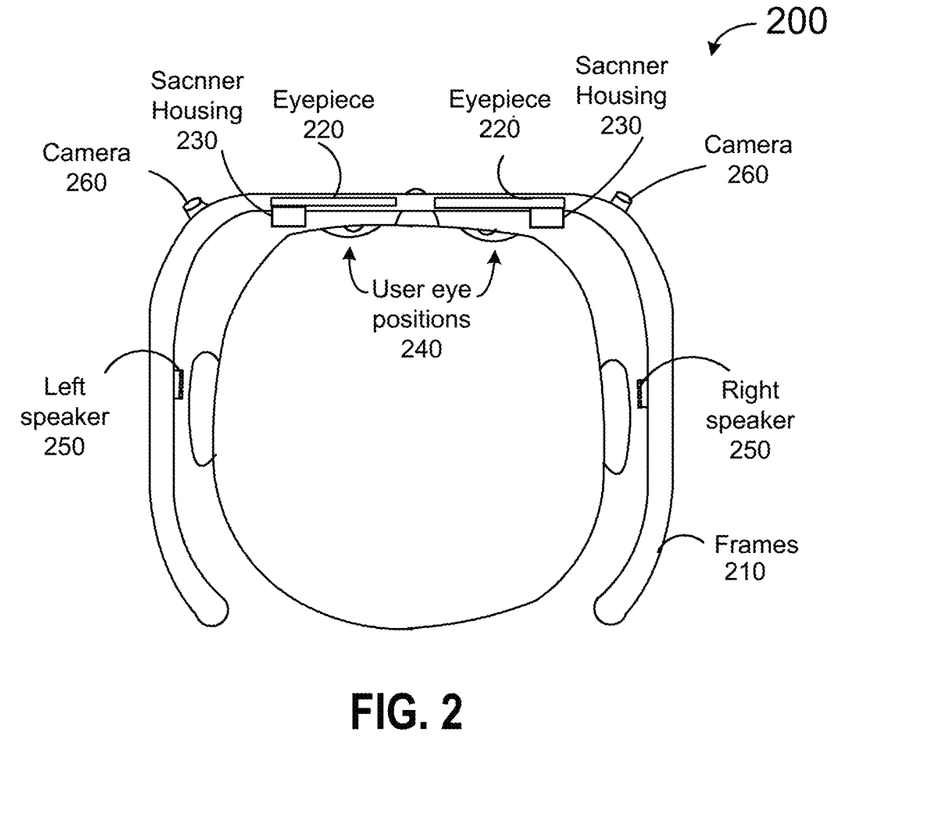
FIG. 2 is a top view of an exemplary augmented reality glasses according to some embodiments.

FIG. 2 is a top view of an exemplary augmented reality glasses 200 according to some embodiments. The augmented reality glasses 200 is an example of a wearable device for virtual reality or augmented reality applications. As shown in FIG. 2, wearable display device 200 can include frames 210 and eyepieces 220. Each eyepiece can be similar to eyepieces 120L, 120R in FIG. 1 and can include an ICG, an OPE, and an EPE, which are not visible in the top view.

Wearable display device 200 can also include scanner housings 230, which can include a scanning mirror for forming a virtual image (e.g., at infinity) from incoming light sources. In some embodiments, the ICGs are used as input ports for receiving light. The images formed by the eyepiece can be viewed from user eye positions 240. The augmented reality glasses can also have left and right speakers 250 and cameras 260.

As described above, the incoming light may include light in the three primary colors, namely blue (B), green (G), and red (R). In some embodiments, the light beams in the incoming light are combined in an optical combiner. For a wearable device for VR and AR applications, it is desirable that the optical combiners in the system are compact and light weight.

Figure 3:
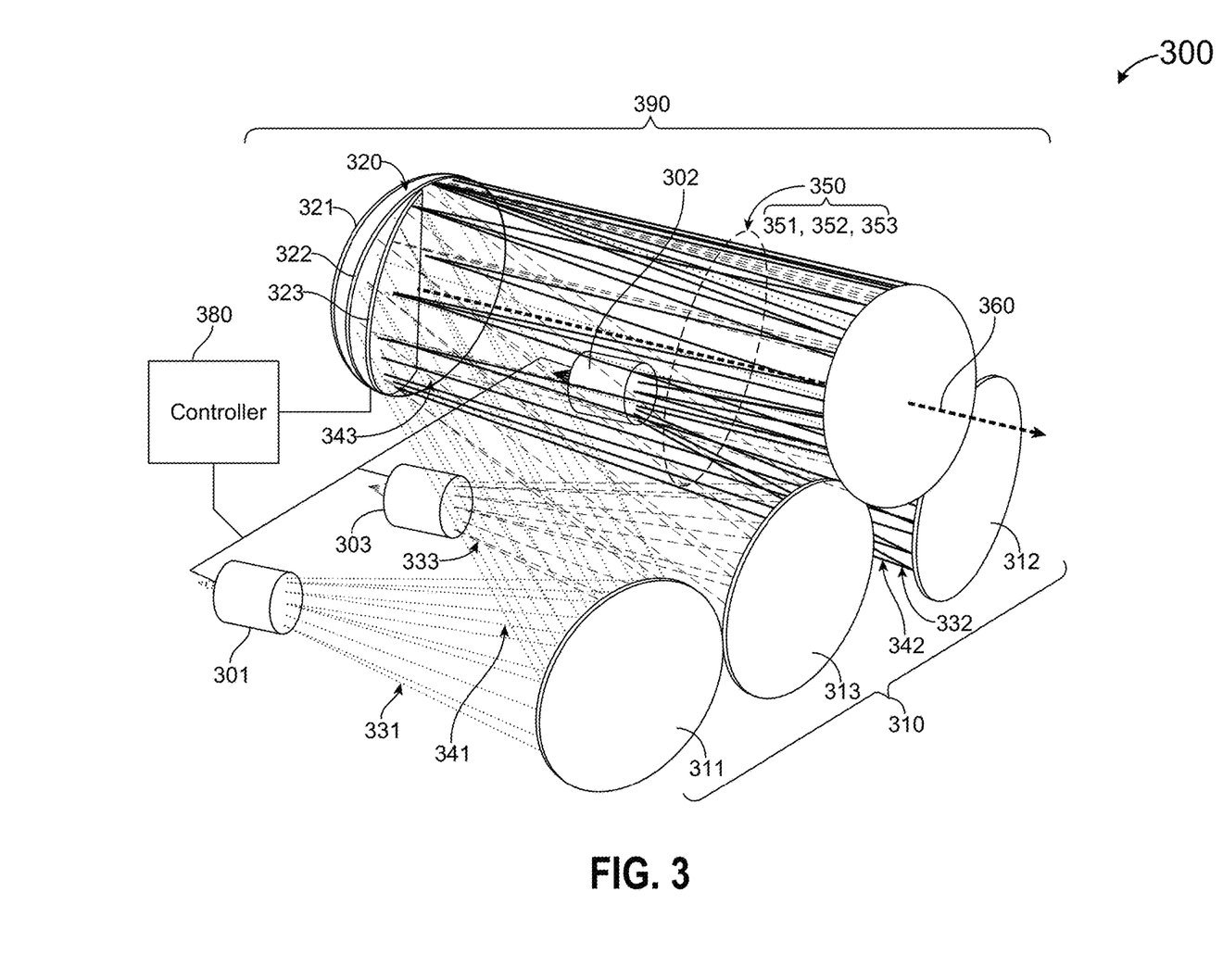
FIG. 3 is a perspective view diagram illustrating an optical illuminator according to some embodiments of the present invention.

FIG. 3 is a perspective view diagram illustrating an optical illuminator according to some embodiments of the present invention. As shown in FIG. 3, an optical illuminator 300 includes an optical combiner (also referred to as a combining element) and three light sources. An optical combiner 390 can include an input mirror assembly 310 configured to receive light beams from two or more light sources and to provide two or more reflected light beams. Optical combiner 390 also has a rotating mirror 320 configured to rotate through a range of angular displacement. Rotating mirror 320 is also configured to receive the two or more reflected light beams to provide a time-sequential collimated combined output light beam along an output optical axis. The rotating mirror 320 is an example of a combining element.

In FIG. 3, the light sources include three laser light sources, including a first light source 301, a second light source 302 (hidden in FIG. 3), and a third light source 303. In this example, the first light source emits a red light beam 331, the second light source 302 emits a green light beam 332, and the third light source 303 emits a blue light beam 333. The input mirror assembly 310 can include two or more input mirrors. In the embodiment of FIG. 3, the input mirror assembly 310 includes a first input mirror 311, a second input mirror 312, and a third input mirror 313. The three input mirrors in input mirror assembly 310 are configured to receive light beams from the light sources and to provide reflected light beams to the rotating mirror 320. For example, the first input mirror 311 receives a red light beam 331 from red laser light source 301 and reflects a red reflected light beam 341 towards the rotating mirror 320. The second mirror 312 receives a green input light beam 332 from green laser light source 302 and reflects a green reflected light beam 342 towards the rotating mirror 320. The third input mirror 313 receives a blue light beam 333 from blue laser light source 303 and reflects a blue reflected light beam 343 towards the rotating mirror 320.

The light beams output by edge-emitting laser diodes can have different parallel and perpendicular divergence angles, resulting in an elliptical beam spot, instead of the circularly symmetric spot. In some embodiments, the first input mirror 311, the second input mirror 312, and the third input mirror 313 can provide collimation and circularization of light beams. Collimation and circularization can be achieved by a combination of refractive lens (for instance, toroidal) and mirrors (rotational symmetric/off-axis parabolic or free-form).

In some embodiments of the invention, rotating mirror 320 is configured to rotate through a range of angular displacement. In FIG. 3, rotating mirror 320 is shown at three different angular displacements: position 321 indicating the rotating mirror at a first angular displacement, position 322 indicating the rotating mirror at a second angular displacement, and position 323 indicating the rotating mirror at a third angular displacement.

The optical combiner 390 is configured to provide a time-sequential collimated combined output light beam 350 along an output optical axis 360. During a first time period, the rotating mirror 320 is disposed at a first angular displacement 321 and configured to receive the first reflected light beam 341 from the input mirror assembly and provide a first output light beam 351 along the output optical axis 360. During a second time period, the rotating mirror 320 is disposed at a second angular displacement 322, and configured to receive the second reflected light beam 342 from the input mirror assembly and provide a second output light beam 352 along the output optical axis 360. In the example of FIG. 3, three light sources are provided and, during a third time period, the rotating mirror 320 is disposed at a third angular displacement 323, and configured to receive the third reflected light beam 343 from the input mirror assembly 310 and provide a third output light beam 353 along the output optical axis 360. The optical combiner 390 is configured to provide a time-sequential collimated combined output light beam 350 along the output optical axis. The time-sequential collimated combined output light beam 350 includes output beams 351, 352, and 353 originated from three different light sources.

The optical combiner 390 is configured to receive light beams from red, green, and blue light sources to provide time sequential collimated combined red, green, and blue (RGB) output light beams. In FIG. 3, a controller 380 is shown coupled to light sources 301, 302, and 303 and the rotating mirror 320 for controlling the timing of the rotation of rotating mirror 320 and the emission of light beams. As shown in FIG. 3, the light sources 301, 302, and 303 and input mirrors 311, 312, and 313 can be disposed in a two-dimensional planar configuration. The rotating mirror can be offset in a third dimension. The spatial arrangement of the input mirror assembly and the combining element (in this case, the rotating mirror) provides folded optical paths to reduce the dimension of the optical combiner. In some embodiments, optical illuminator 300 can be formed in a 2 mm by 2 mm or 3 mm by 3 mm package. Further, the rotating mirror 320 can be a MEMS mirror, which can be lighter than conventional glass combiners.

In some embodiments, the rotating mirror 320 can be configured to provide a dithering vibration of the output light beam 350 to reduce speckles. Speckle patterns can occur in reflections of monochromatic light such as a laser light off an imperfect reflecting surface. The speckle effect is a result of the interference of many waves of the same frequency, having different phases and amplitudes, which add together to give a resultant wave whose amplitude, and therefore intensity, varies randomly. Providing a dithering vibration of the reflecting mirror can reduce speckles. In some embodiments, the speckles can be reduced with a dithering vibration of the reflecting surface in combination with a diffusing element.

Figure 4A:
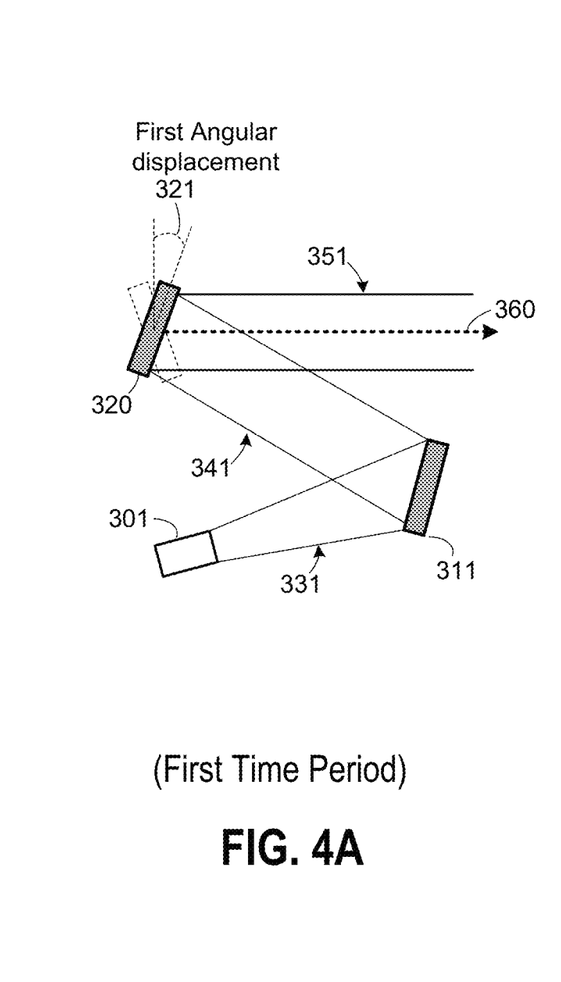
FIGS. 4A, 4B, and 4C are simplified schematic diagrams illustrating the operation of an optical combiner according to some embodiments of the present invention.
Figures 4B, 4C:
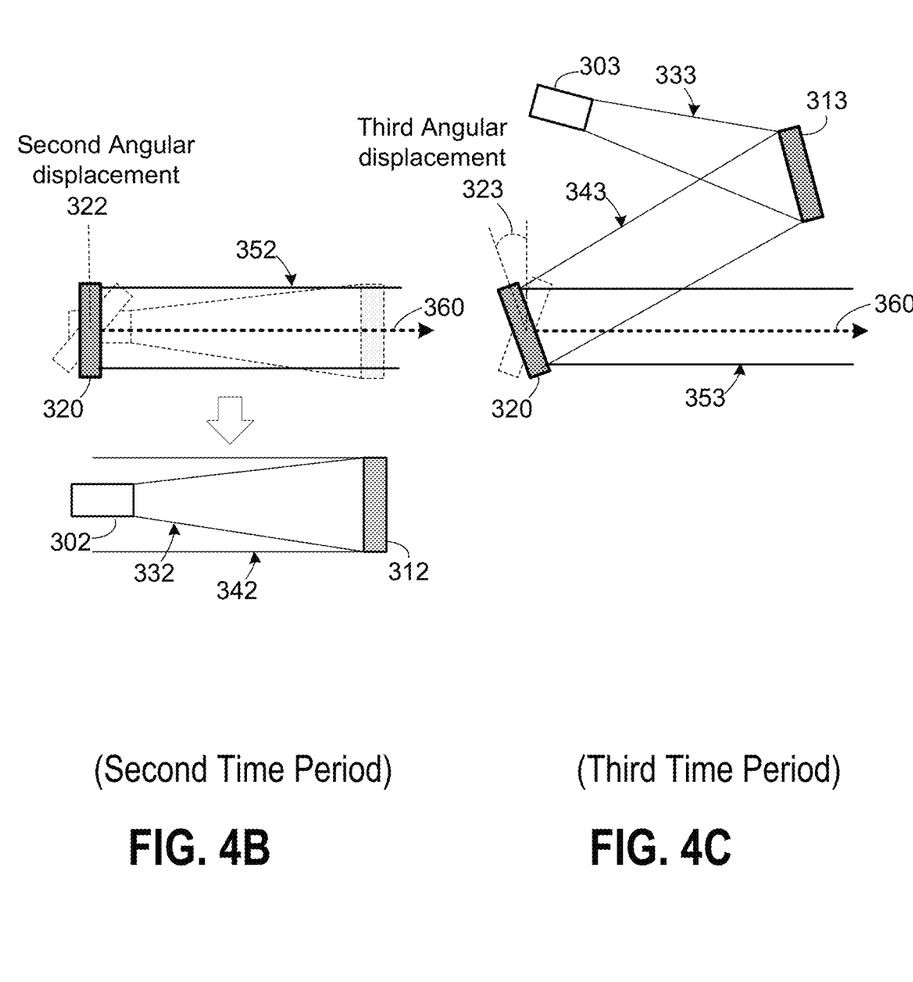

FIGS. 4A-4C are simplified schematic diagrams illustrating the operation of an optical combiner according to some embodiments of the present invention. FIGS. 4A-4C illustrate top views of optical combiner 390 of FIG. 3 during each of three time periods of operation to provide a time-sequential collimated combined output light beam. FIG. 4A shows that, during a first time period, the rotating mirror 320 is disposed at a first angular displacement 321. The first light source 301 emits a first light beam 331 to the first input mirror 311 of the input mirror assembly, which directs reflected light beam 341 towards the rotation mirror 320. The rotating mirror 320 is configured to receive the first reflected light beam 341 from the first input mirror 311 of the input mirror assembly and provide a first output light beam 351 along the output optical axis 360. In FIG. 4B, during a second time period, the rotating mirror 320 is disposed at a second angular displacement 322. The second light source 302 emits a second light beam 332 to the second mirror 312 of the mirror assembly, which directs reflected light beam 342 towards the rotation mirror 320. The rotating mirror 320 is configured to receive a second reflected light beam 342 from the second mirror 312 of the input mirror assembly and provide a second output light beam 352 along the output optical axis 360. In FIG. 4B, elements 302, 312, 332, and 342 are hidden from the top view. Therefore, these elements are reproduced below the main figure for illustration purposes. In FIG. 4C, during a third time period, the rotating mirror 320 is disposed at a third angular displacement 323. The third light source 303 emits a third light beam 333 to the third mirror 313 of the mirror assembly, which directs reflected light beam 343 towards the rotation mirror 320. The rotating mirror 320 is configured to receive the third reflected light beam 343 from the third mirror 313 of the input mirror assembly and provide a third output light beam 353 along an output optical axis 360. The optical combiner 390 is configured to provide a time-sequential combined output light beam 350 along the output optical axis 360. The time-sequential collimated combined output light beam 350 includes output beams 351, 352, and 353 originated from three different light sources in a time-sequential manner.

Figure 5:
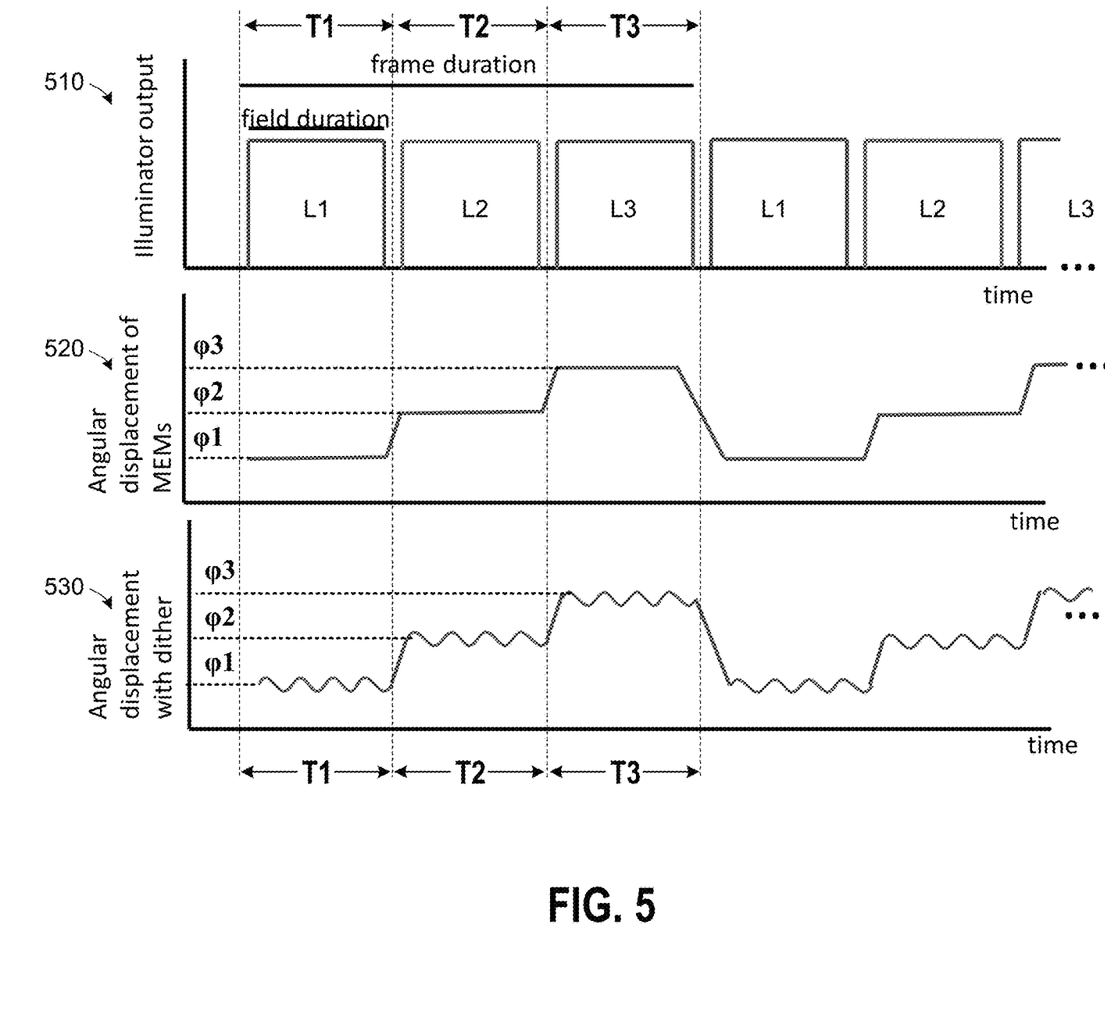
FIG. 5 is a timing diagram illustrating the operation of an optical illuminator according to some embodiments of the present invention.

FIG. 5 is a timing diagram illustrating the operation of an optical combiner according to some embodiments of the present invention. The horizontal axis represents the time. A frame duration is shown as having three field durations, also referred to as three time periods: T1, T2, and T3. Each of the time periods can be a field duration for a color. For example, a frame duration can have a period length of 1 msec to 1000 msec, depending on the overall integration time, and a field duration can have a period length of 0.25 msec to 500 msec. The first vertical axis 510 shows the illuminator output of an optical illuminator. The second vertical axis 520 shows the angular displacement of the rotating mirror, e.g., a MEMS mirror. The third vertical axis 530 shows the angular displacement of the rotating mirror including the dither component.

During the first time period, the rotating mirror is at a first angular displacement, and the illuminator output is the first output light beam L1 originated from the first light source. Similarly, during the second time period, the rotating mirror is at the second angular displacement, and the illuminator output is the second output light beam L2 originated from the second light source. Further, during the third time period, or field duration, the rotating mirror is at the third angular displacement, and the illuminator output is the third output light beam L3 originated from the third light source. In this example, the first light source is a red laser light source, the second light source is a green laser light source, and the third light source is a blue laser light source. The optical illuminator is configured to provide a time-sequential collimated combined output light beam along the output optical axis including red, green, and blue light beams.

In FIG. 5, the second vertical axis 520 shows the angular displacements of the rotating mirror. During the first time period, the rotating mirror is at a first angular displacement φ1. Similarly, during the second time period, the rotating mirror is at the second angular displacement φ2 Further, during the third time period, the rotating mirror is at the third angular displacement φ3.

In FIG. 5, the third vertical axis 530 shows the angular displacements of the rotating mirror including dithering components. In each of the time periods, the rotating mirror is configured to make small dithering movements to reduce speckle effects. For example, the dithering movement can involve the rotation mirror to move an angular displacement of 0.1 degrees to 20 degrees. The dithering motion can have a period length of less than 1 μsec (e.g., 0.2 μsec) to 100 msec.

Figure 6:
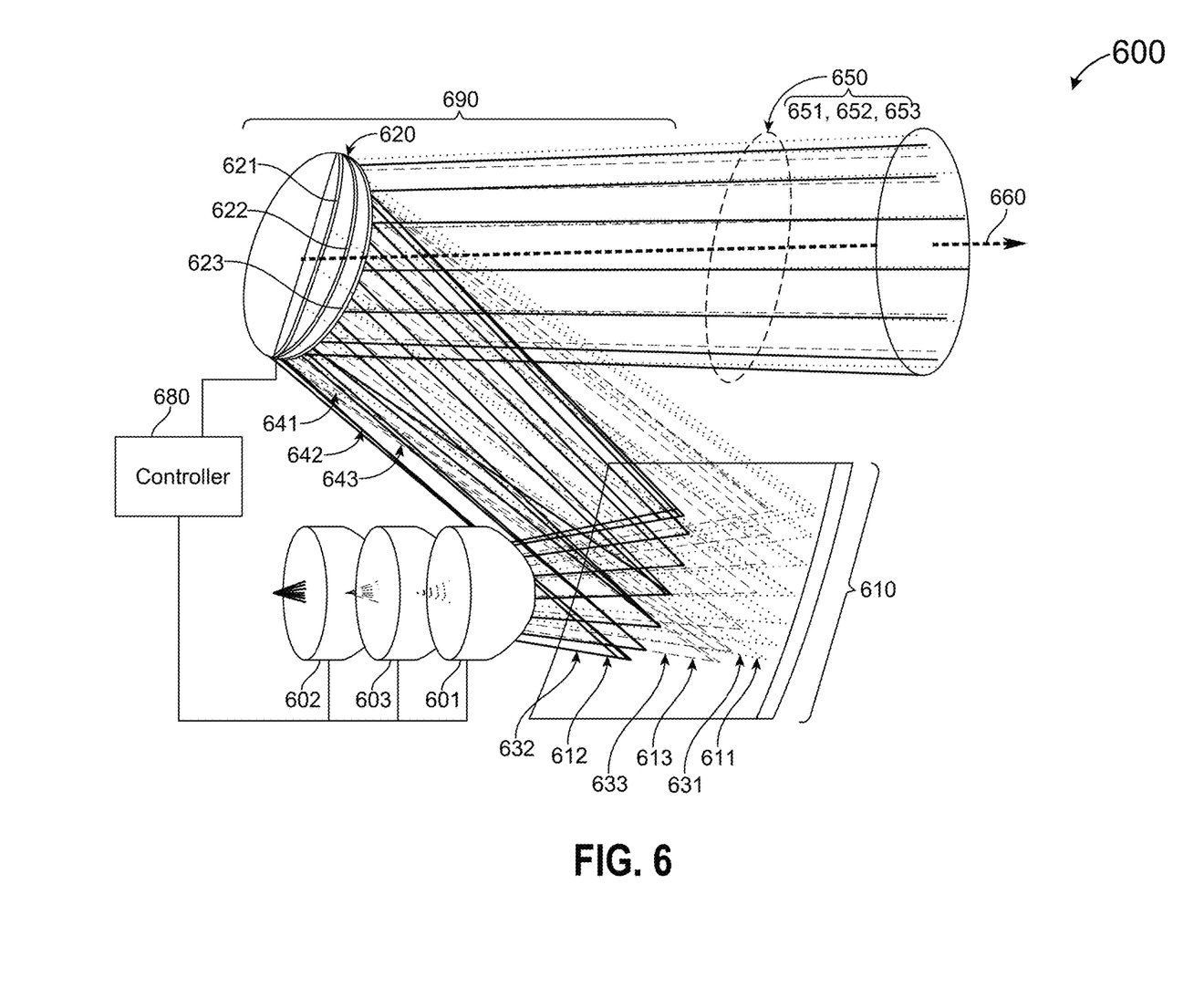
FIG. 6 is a perspective view diagram illustrating another optical illuminator according to some embodiments of the present invention.

FIG. 6 is a perspective view diagram illustrating another optical illuminator according to some embodiments of the present invention. As shown in FIG. 6, an optical illuminator 600 includes an optical combiner 690 and two or more light sources. An optical combiner 690 includes an input mirror assembly 610 configured to receive light beams from two or more light sources and to provide two or more reflected light beams. Optical combiner 690 also has a rotating mirror 620 configured to receive the two or more reflected light beams to provide a time-sequential collimated combined output light beam along a common output optical axis.

The optical illuminator 600 in FIG. 6 is similar to the optical illuminator 300 in FIG. 3. One difference is that the input mirror assembly 610 includes a curved reflective element, instead of three input mirrors as in input mirror assembly 310 in FIG. 3. As an example of the curved reflective element 610, a parabolic mirror 610 is used in the following description. In FIG. 6, the light sources include three laser light sources, including a first light source 601, a second light source 602, and a third light source 603. In this example, the first light source emits a red light beam 631, the second light source 602 emits a green light beam 632, and the third light source 603 emits a blue light beam 633. In the embodiment of FIG. 6, the input mirror assembly 610 includes a parabolic mirror configured to receive light beams from the light sources and to provide reflected light beams to the rotating mirror 620. For example, a first region 611 of parabolic mirror 610 receives red light beam 631 from red laser light source 601 and reflects a red reflected light beam 641 towards the rotating mirror 620. A second region 612 of parabolic mirror 610 receives green light beam 632 from green laser light source 602 and reflects a green reflected light beam 642 towards the rotating mirror 620. A third region 613 of parabolic mirror 610 receives blue light beam 633 from blue laser light source 603 and reflects a blue reflected light beam 643 towards the rotating mirror 620.

Similar to rotating mirror 320 in FIG. 3, rotating mirror 620 of FIG. 6 is configured to rotate through a range of angular displacement. In FIG. 6, rotating mirror 620 is shown at three different angular displacements: position 621 indicating the rotating mirror at a first angular displacement, position 622 indicating the rotating mirror at a second angular displacement, and position 623 indicating the rotating mirror at a third angular displacement.

The optical combiner 690 is configured to provide a time-sequential collimated combined output light beam 650 along an output optical axis 660. During a first time period, the rotating mirror 620 is disposed at a first angular displacement 621 and configured to receive a first reflected light beam 641 from the input mirror assembly and provide a first output light beam 651 along the output optical axis 660. During a second time period, the rotating mirror 620 is disposed at a second angular displacement 622, and configured to receive a second reflected light beam 642 from the input mirror assembly and provide a second output light beam 652 along the output optical axis 660. In the example of FIG. 6, three light sources are provided and, during a third time period, the rotating mirror 620 is disposed at a third angular displacement 623, and configured to receive a third reflected light beam 643 from the input mirror assembly 610 and provide a third output light beam 653 along the output optical axis 660. The optical combiner 690 is configured to provide a time-sequential collimated combined output light beam 650 along the output optical axis. The time-sequential collimated combined output light beam 650 includes output beams 651, 652, and 653 originated from three different light sources.

In some embodiments, the input mirror assembly 610 can include a curved reflective element configured to reflect a first light beam emitted from a first light source to the rotating mirror during the first time period when the rotating mirror is at a first angular displacement, and to reflect a second light beam emitted from a second light source to the rotating mirror during the second time period when the rotating mirror is at a second angular displacement. Further, the curved reflective element can also be configured to reflect a third light beam emitted from a third light source to the rotating mirror during a third time period when the rotating mirror is at a third angular displacement. In some embodiments, the curved reflective element can include discrete prescriptions for each individual incidence location on the curved reflective element. In some embodiments, the curved reflective element can include an elliptical or hyperbolic surface contour.

FIG. 6 illustrates an embodiment in which the input mirror assembly 610 is an example of a single curved reflective element. Curved reflective element 610 has not only a single reflective surface for light beams from all channels of light sources, but further has a curved surface as opposed to a linear surface or surface to reflect each channel at a common angle generally. Such a configuration enables smaller beam diameters per channel as compared to a linear reflector, thereby further enabling a single cylinder lens to deliver the light, as opposed to an alternative optical lens necessary to support wider beam diameters that in turn may produce aberrations requiring additional optical components.

In some embodiments, light beams may be incident on the curved reflective element at different locations. In some embodiments, the curved reflective element can have a single prescription for all channels. In some embodiments, the curved reflective element can have discrete prescriptions for each individual channels incidence location on the curved reflective element. In some embodiments, the curved reflective element can have an elliptical surface contour, such as an elliptical mirror. In some embodiments, the curved reflective element can have a parabolic surface contour, such as a parabolic mirror. In some embodiments, the curved reflective element can have a hyperbolic surface contour, such as a hyperbolic mirror.

In some embodiments, the curved reflective element can follow a prescription corresponding to the following equation:

$$z = cy^2/1 + \sqrt{1-(1+k)c^2y^2} + \alpha_1 y^2 + \alpha_2 y^4 + \alpha_3 y^6 + \alpha_4 y^8 + \alpha_5 y^{10} + \alpha_6 y^{12}$$

where c is the curvature of the base radius, k is the conic constant (for parabola=−1), and the coefficients α are polynomial aspheric coefficients. The output facet of laser may be offset in z and y to position the laser at best focus. The curve is defined in z-y plane and is generally constant in the x-dimension. The x-dimension spans outputs from one or more lasers. In some embodiments, x can be swept through an arc. Many embodiments have aspheric coefficient values α of zero, although in some embodiments, at least one aspheric coefficient is non-zero.

In some embodiments, a uniform surface finish can be applied to the curved reflective element. In some embodiments, discrete surface finishing per channel incidence upon the curved reflective element is applied. While the subject invention has been described with reference to some preferred embodiments, various changes and modifications could be made therein by one skilled in the art, without varying from the scope and spirit of the subject invention.

In FIG. 6, a controller 680 is coupled to light sources 601, 602, and 603 and the rotating mirror 620 for timing control, similar to control 380 in FIG. 3. The control mechanism described above in connection to FIG. 5 also applies to optical illuminator 600 of FIG. 6. Further, in some embodiments, the rotating mirror 620 can be configured to dither the combined output light beam 350 to reduce speckles. In some embodiments, the curved reflective element 610 can also provide collimation and circularization. For example, the curved reflective element can provide, where both directions/or one direction of the beam will be collimated, and the beam can be made circular.

Figure 7A:
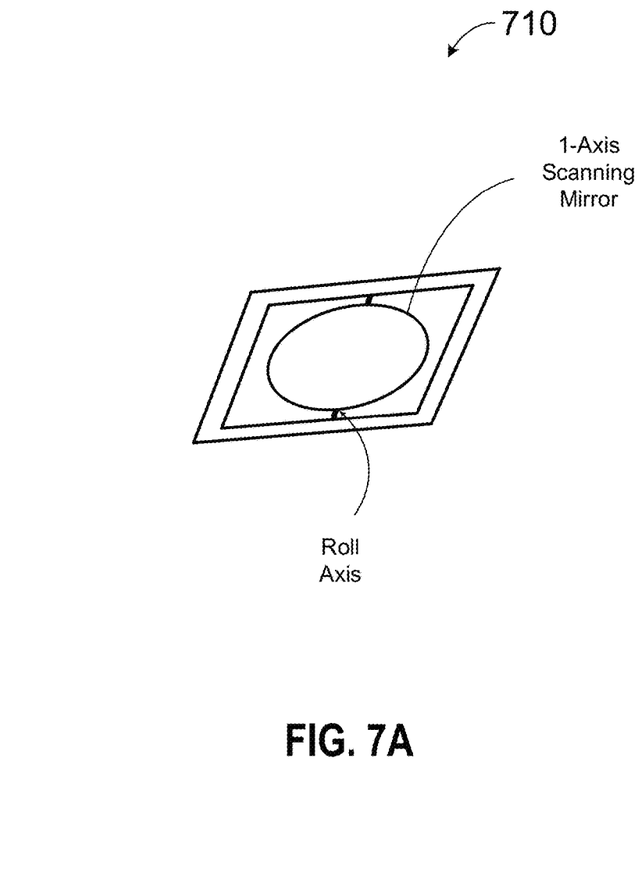
FIGS. 7A and 7B are perspective views of a 1-axis rotating mirror and a 2-axis rotating mirror that can be used in an optical illuminator.
Figure 7B:
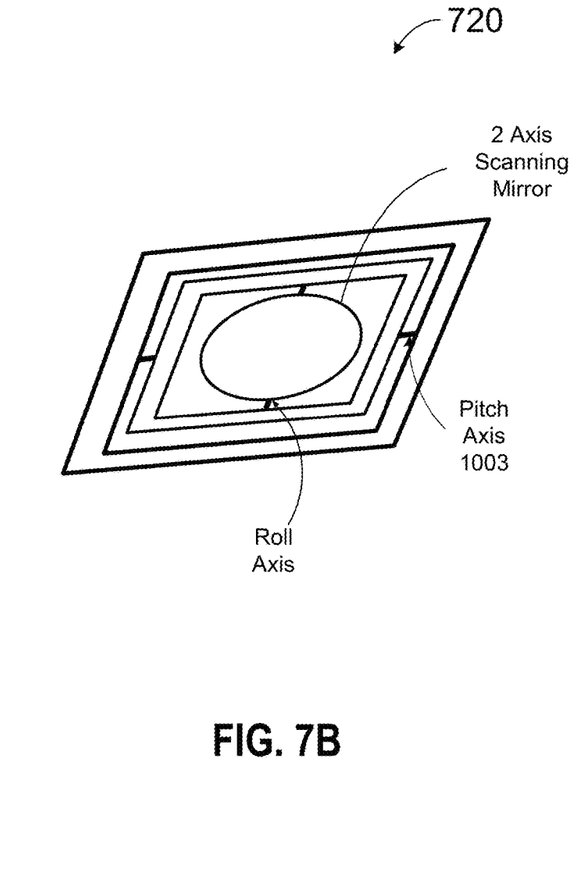

FIG. 7A is a perspective view of a 1-axis rotating mirror 710 and FIG. 7B is a perspective view of a 2-axis rotating mirror 720 that can be used as the rotating mirror 320 in optical illuminator 300 shown in FIG. 3 and or the rotating mirror 620 in optical illuminator 600 shown in FIG. 6. In some embodiments, 1-axis scanning mirror 710 can be a MEMS one-dimensional rotating mirror, configured to rotate in one dimension with a roll axis. 2-axis scanning mirror 720 can be a MEMS two-dimensional scanning mirror, configured to rotate in two dimensions with a pitch axis and a roll axis. In FIGS. 3 and 6, the rotating mirror is rotated to receive incident light beams originated from different light sources to provide a combined collimated time-sequential output light beam. The rotating mirror is also used to provide dithering vibration for speckle reduction. Depending on the embodiments, the rotation mirror can be actuated using electrostatic, magnetic, or piezoelectric means.

Figure 8:
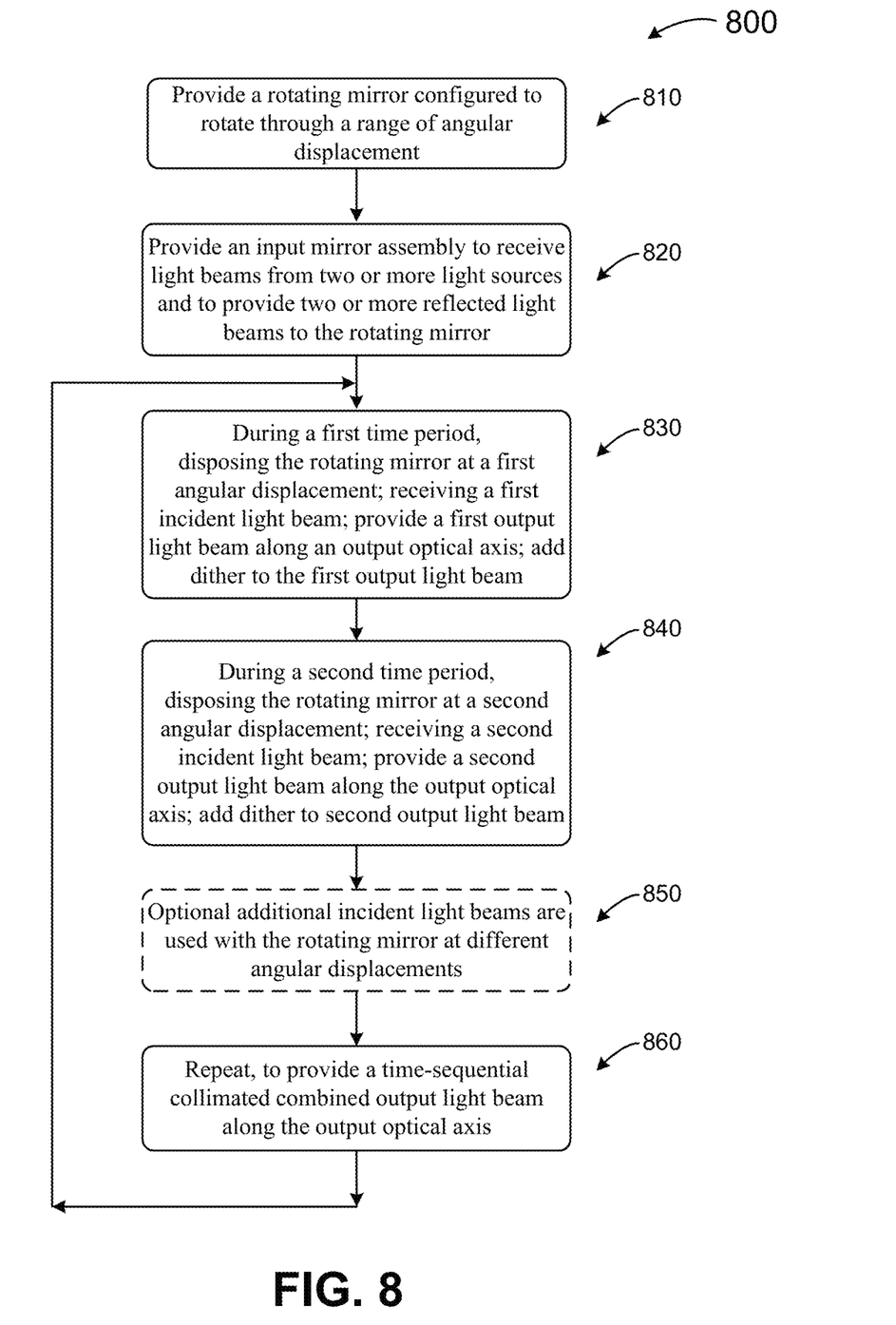
FIG. 8 is a flowchart illustrating a method for an optical combiner according to some embodiments of the present invention.

FIG. 8 is a flowchart illustrating a method for combining light beams from multiple light sources according to some embodiments of the present invention. In some embodiments, a method for combining light beams from multiple light sources includes, during a first time period, disposing a rotating mirror at a first angular displacement, and receiving a first incident light beam to provide a first output light beam along an output optical axis. During a second time period, the method includes disposing the rotating mirror at a second angular displacement, and receiving a second incident light beam to provide a second output light beam along the output optical axis. The method further includes repeating the above operation to provide a time-sequential collimated combined output light beam along the output optical axis. The method 800 of FIG. 8 can be summarized as follows.

At 810, the method provides a rotating mirror configured to rotate through a range of angular displacement. Examples of the rotating mirror are described above in connection with FIGS. 3-9. The rotating mirror can be a one-axis MEMS (micro electrical mechanical system) mirror or a two-axis MEMS mirror, with a reflective surface. Depending on the embodiments, the mirror can also provide collimation.

At 820, the method provides an input mirror assembly configured to receive light beams from two or more light sources and to provide two or more reflected light beams, which form incident light beams to the rotating mirror. Examples of the rotating mirror are described above in connection with FIGS. 3 and 6. In some embodiments, the input mirror assembly can include two or more separate input mirrors. A first input mirror can be disposed in a first light path between the rotating mirror and the first light source and configured to reflect a first light beam emitted from the first light source and direct the first reflected light beam to the rotating mirror during the first time period when the rotating mirror is at a first angular displacement. A second input mirror can be disposed in a second light path between the rotating mirror and the first light source and configured to reflect a second light beam emitted from the second light source and direct the second reflected light beam to the rotating mirror during the second time period when the rotating mirror is at a second angular displacement. Depending on the embodiments, there can be three or more input mirrors in the mirror assembly. The mirrors can also provide collimated and circularized output light beams.

In alternative embodiments, the mirror assembly can include a curved reflective element configured to reflect the first input light beam emitted from the first light source to the rotating mirror during the first time period when the rotating mirror is at the first angular displacement, and to reflect the second input light beam emitted from the second light source to the rotating mirror during the second time period when the rotating mirror is at the second angular displacement. An example of the curved reflective element is described above in connection with FIG. 6.

Steps 830 and 840 summarize the operation of the optical combiner. At 830, during a first time period, the method includes disposing the rotating mirror at a first angular displacement, and receiving a first incident light beam to provide a first output light beam along an output optical axis. At 840, during a second time period, the method includes disposing the rotating mirror at a second angular displacement, and receiving a second incident light beam to provide a second output light beam along an output optical axis. The method can also include dithering the output light beam using the rotating mirror. More details about the operation are described above in connection to FIG. 3-8.

At 850, optionally, during a third time period, the method includes disposing a rotating mirror at a third angular displacement, and receiving a third incident light beam to provide a third output light beam along an output optical axis. Depending on the embodiments, additional incident light beams can be used with the rotating mirror at different angular displacements.

At 860, the above processes can be repeated to provide a time-sequential collimated combined output light beam along the output optical axis. More details are described above in connection to FIG. 3-8.

Figure 9:
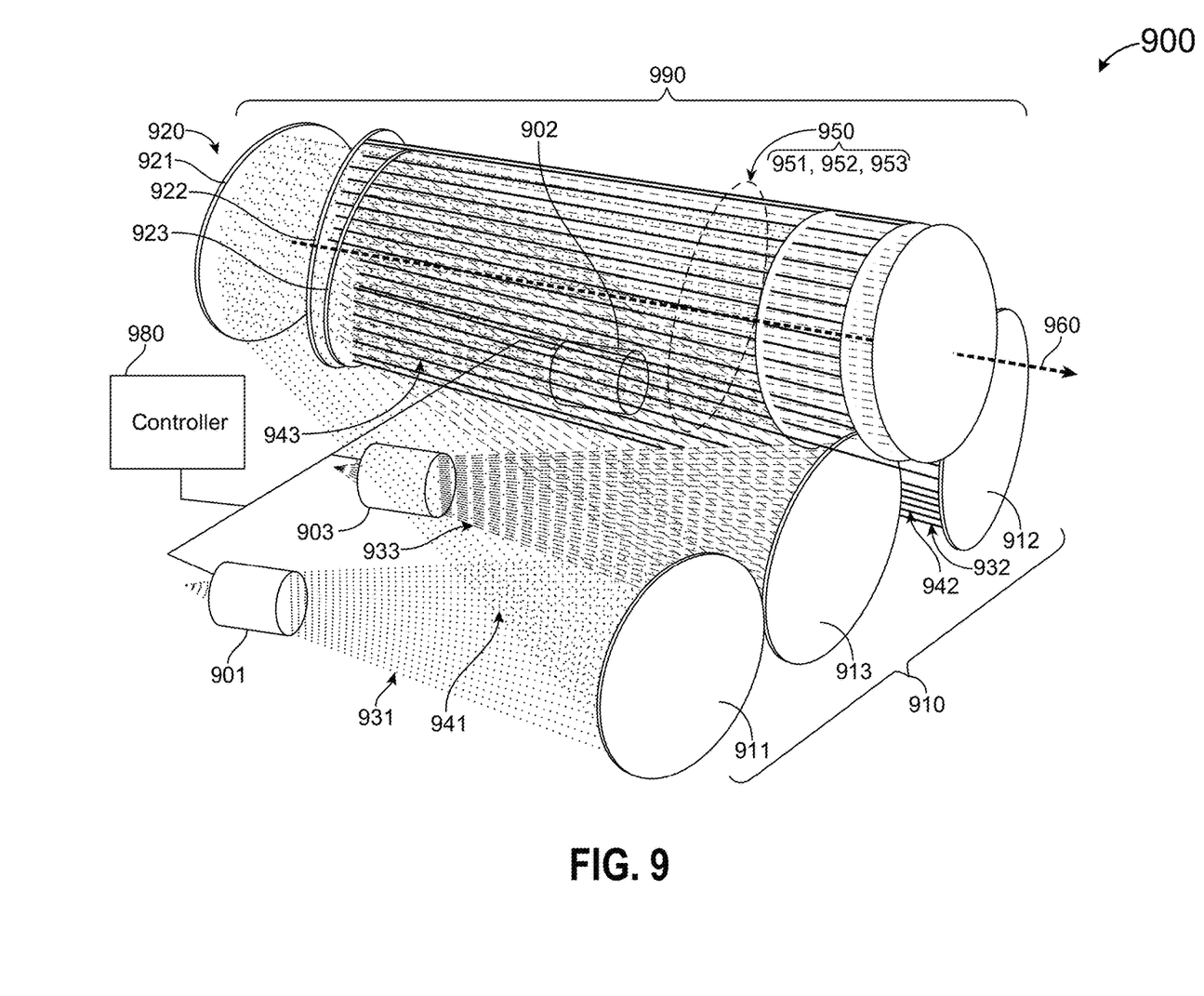
FIG. 9 is a perspective view diagram illustrating yet another optical illuminator according to some embodiments of the present invention.

FIG. 9 is a perspective view diagram illustrating another optical illuminator according to some embodiments of the present invention. As shown in FIG. 9, an optical illuminator 900 includes an optical combiner 990 and two or more light sources, e.g., 901, 902, and 903. The optical combiner 990 includes an input mirror assembly 910 configured to receive light beams from the two or more light sources and to provide two or more reflected light beams. Optical combiner 990 also has a dichroic mirror assembly 920 configured to receive the two or more reflected light beams to provide a time-sequential collimated combined output light beam along an output optical axis. The dichroic mirror assembly 920 is another example of a combining element.

The optical illuminator 990 in FIG. 9 is similar to optical illuminator 300 in FIG. 3. One difference is that the rotating mirror 320 in FIG. 3 is now replaced by the dichroic mirror assembly 920. As shown in FIG. 9, the dichroic mirror assembly 920 includes three dichroic mirrors 921, 922, and 923 disposed at three different angular displacements to receive the reflected light beams to provide a collimated combined output light beam 950 along the output optical axis.

In FIG. 9, the light sources include three laser light sources, e.g., a first light source 901, a second light source 902 (hidden in FIG. 9), and a third light source 903. In this example, the first light source emits a red light beam 931, the second light source 902 emits a green light beam 932, and the third light source 903 emits a blue light beam 933. The input mirror assembly 910 can include two or more input mirrors. In the embodiment of FIG. 9, the input mirror assembly 910 includes a first input mirror 911, a second input mirror 912, and a third input mirror 913. Each of the three input mirrors in input mirror assembly 910 are configured to receive light beams from a light source and to provide reflected light beams to the rotating mirror 920. For example, the first input mirror 911 receives a red light beam 931 from red laser light source 901 and reflects a red reflected light beam 941 towards the dichroic mirror assembly 920. The second input mirror 912 receives a green light beam 932 from green laser light source 902 and reflects a green reflected light beam 942 towards the dichroic mirror assembly 920. The third input mirror 913 receives blue light beam 933 from blue laser light source 903 and reflects a blue reflected light beam 943 towards the dichroic mirror assembly 920.

In the example of FIG. 9, dichroic mirror assembly 920 is shown to include three dichroic mirrors. A dichroic mirror is a mirror with significantly different reflection or transmission properties at two different wavelengths. In this example, the first dichroic mirror 921 in dichroic mirror assembly 920 is configured to reflect a light beam from the first input mirror 911 in mirror assembly 920. In the example of FIG. 9, the first dichroic mirror 921 is configured to reflect red light beams. The first dichroic mirror 921 is also configured to transmit green and blue light beams. The second dichroic mirror 922 in dichroic mirror assembly 920 is configured to reflect the light beam from the second input mirror 912 in input mirror assembly 910 and to transmit the light beam from the first input mirror 911. In the example of FIG. 9, the second dichroic mirror 922 is configured to reflect green light beams and to transmit red and blue light beams. The third dichroic mirror 923 in dichroic mirror assembly 920 is configured to reflect a light beam from the third input mirror 913 in input mirror assembly 910, and to transmit the light beams from the first input mirror 911 and the second input mirror 912 in input mirror assembly 910. In the example of FIG. 9, the third dichroic mirror 923 is configured to reflect blue light beams and to transmit red light beams and green light beams.

Moreover, the mirrors in the dichroic mirror assembly 920 are oriented such that they reflect light beams from different light sources to produce output light beams along a common optical axis 960 to enable the optical combiner 990 to provide a collimated combined output light beam 950 along the common output optical axis 960. The first dichroic mirror 921 of the dichroic mirror assembly 920 is configured to receive a first reflected light beam 941 from the input mirror assembly and provide a first output light beam 951 along the output optical axis 960. The second dichroic mirror 922 of the dichroic mirror assembly 920 is configured to receive a second reflected light beam 942 from the input mirror assembly and provide a second output light beam 952 along the output optical axis 960. The third dichroic mirror 923 of the dichroic mirror assembly 920 is configured to receive a third reflected light beam 943 from the input mirror assembly 910 and provide a third output light beam 953 along the output optical axis 960. The optical combiner 990 is configured to provide a collimated combined output light beam 950 along the output optical axis 960. Moreover, a portion of the first output light beam passes through the second dichroic mirror and the third dichroic mirror before reaching the first dichroic mirror, and a portion of the second output light beam passes through the third dichroic mirror before reaching the second dichroic mirror. As illustrated in FIG. 9, the collimated combined output light beam 950 includes output beams 951, 952, and 953 originated from three different light sources 901, 902, and 903.

In some embodiments of the optical combiner 990, a portion of the first reflected light beam passes through the third dichroic mirror in dichroic mirror assembly 920 and a portion of the second dichroic mirror in dichroic mirror assembly 920 before reaching the first dichroic mirror in dichroic mirror assembly 920. Further, a portion of the second reflected light beam passes through the third dichroic mirror in dichroic mirror assembly 920 before reaching the second dichroic mirror in dichroic mirror assembly 920. Optical illuminator 900 can also include a controller 980 coupled to light sources 901, 902, and 903 for timing control.

In a wearable device, the control mechanisms described above may be operatively coupled, such as by a wired lead or wireless connectivity, to a data processing module, which may be mounted in a variety of configurations, such as fixedly attached to the frame, fixedly attached to a helmet or hat worn by the user, embedded in headphones, or otherwise attached to a user. The data processing module may include one or more processors configured to analyze and process data and/or image information.

While the preferred embodiments of the invention have been illustrated and described, it will be clear that the invention is not limited to these embodiments only. Numerous changes, modifications, variations, substitutions and equivalents will be apparent to those skilled in the art without departing from the spirit and scope of the invention as described in the claims.

What is claimed is:

1. An optical combiner comprising a curved reflective element and a rotating mirror configured to rotate through a range of angular displacement, wherein:
during a first time period, the curved reflective element is configured to reflect a first light beam emitted from a first light source to the rotating mirror when the rotating mirror is disposed at a first angular displacement, and the rotating mirror is configured to receive the first light beam and provide a first output light beam along an output optical axis;

during a second time period, the curved reflective element is configured to reflect a second light beam emitted from a second light source to the rotating mirror when the rotating mirror is disposed at a second angular displacement, and the rotating mirror is configured to receive the second light beam and provide a second output light beam along the output optical axis; and whereby the optical combiner is configured to provide a time sequential collimated combined light beam.

2. The optical combiner of claim 1 wherein the rotating mirror is configured to dither the first output light beam and the second output light beam.

3. The optical combiner of claim 1 wherein:

the first light beam is incident on a first region on the curved reflective element; and the second light beam is incident on a second region on the curved reflective element, wherein the second region is different from the first region.

4. The optical combiner of claim 3 wherein the curved reflective element comprises discrete prescriptions for the first region and the second region.

5. The optical combiner of claim 3 wherein the curved reflective element comprises a single prescription for the first region and the second region.

6. The optical combiner of claim 5 wherein the curved reflective element follows a prescription corresponding to the following equation:

$$z = cy^2 / 1 + \sqrt{1-(1+k)c^2 y^2} + \alpha_1 y^2 + \alpha_2 y^4 + \alpha_3 y^6 + \alpha_4 y^8 + \alpha_5 y^{10} + \alpha_6 y^{12}$$

where the curve of the curved reflective element is defined in z-y plane, c is the curvature of the base radius, k is the conic constant, and the coefficients $\alpha$ are polynomial aspheric coefficients.

7. The optical combiner of claim 6 wherein k=−1.

8. The optical combiner of claim 1 wherein the curved reflective element comprises a parabolic surface contour.

9. A method for combining light beams from multiple light sources, the method comprising:

(a) during a first time period:

receiving a first input light beam from a first light source using a curved reflective element;

reflecting, using the curved reflective element, the first input light beam to form a first reflected light beam;

disposing a rotating mirror at a first angular displacement; and reflecting, using the rotating mirror, the first reflected light beam to provide a first output light beam along an output optical axis;

(b) during a second time period:

receiving a second input light beam from a second light source using the curved reflective element;

reflecting, using the curved reflective element, the second input light beam to form a second reflected light beam;

disposing the rotating mirror at a second angular displacement; and reflecting, using the rotating mirror, the second reflected light beam to provide a second output light beam along the output optical axis; and repeating (a) and (b) to provide a time sequential collimated combined output light beam along the output optical axis.

10. The method of claim 9 further comprising dithering the time sequential collimated combined output light beam using the rotating mirror.

11. The method of claim 9 wherein:

the first input light beam is incident on a first region on the curved reflective element; and the second input light beam is incident on a second region on the curved reflective element, wherein the second region is different from the first region.

12. The method of claim 11 wherein the curved reflective element comprises discrete prescriptions for the first region and the second region.

13. The method of claim 11 wherein the curved reflective element comprises a single prescription for the first region and the second region.

14. The method of claim 13 wherein the curved reflective element follow a prescription corresponding to the following equation:

$$z = cy^2 / 1 + \sqrt{1-(1+k)c^2 y^2} + \alpha_1 y^2 + \alpha_2 y^4 + \alpha_3 y^6 + \alpha_4 y^8 + \alpha_5 y^{10} + \alpha_6 y^{12}$$

where the curve of the curved reflective element is defined in z-y plane, c is the curvature of the base radius, k is the conic constant, and the coefficients $\alpha$ are polynomial aspheric coefficients.

15. The method of claim 14 wherein k=−1.

16. The method of claim 9 wherein the curved reflective element comprises a parabolic surface contour.

* * * * *

UNITED STATES PATENT AND TRADEMARK OFFICE
CERTIFICATE OF CORRECTION

| | | |
|---|---|---|
| PATENT NO. | : 11,693,251 B2 | Page 1 of 1 |
| APPLICATION NO. | : 17/939879 | |
| DATED | : July 4, 2023 | |
| INVENTOR(S) | : Kristina Uhlendorf | |

It is certified that error appears in the above-identified patent and that said Letters Patent is hereby corrected as shown below:

In the Claims

In Column 18, Line 36, Claim 14: please delete "follow" and insert --follows--.

Signed and Sealed this
Fifth Day of September, 2023

*Katherine Kelly Vidal*
Katherine Kelly Vidal
*Director of the United States Patent and Trademark Office*